US005733350A

United States Patent [19]
Muller et al.

[11] Patent Number: 5,733,350
[45] Date of Patent: Mar. 31, 1998

[54] CONTAINER FOR SOLID FILTRATION MEDIA AND FILTRATION SYSTEM UTILIZING SAME

[75] Inventors: Christopher O. Muller, Lawrenceville; James W. Mash, Peachtree; Jeffery F. Rabon, Lawrenceville, all of Ga.

[73] Assignee: Purafil, Inc., Doraville, Ga.

[21] Appl. No.: 689,668

[22] Filed: Aug. 13, 1996

[51] Int. Cl.$^6$ ................................................. B01D 50/00
[52] U.S. Cl. ........................... 55/482; 55/501; 55/516; 55/518; 55/DIG. 31
[58] Field of Search ................ 55/516, 518, 511, 55/501, DIG. 31, 482; 96/129, 136, 138

[56] References Cited

U.S. PATENT DOCUMENTS

| | | |
|---|---|---|
| 557,371 | 3/1896 | Ferguson . |
| 2,118,271 | 5/1938 | Slayter . |
| 2,677,436 | 5/1954 | Mazek . |
| 2,687,781 | 8/1954 | Sens . |
| 2,715,453 | 8/1955 | Lange . |
| 2,738,225 | 3/1956 | Meek . |
| 3,016,108 | 1/1962 | Myddelton . |
| 3,237,387 | 3/1966 | Haugen . |
| 3,243,942 | 4/1966 | Burke ........................ 9/129 |
| 3,319,401 | 5/1967 | Bogardus . |
| 3,411,273 | 11/1968 | Duncan et al. ............... 96/129 |
| 3,555,787 | 1/1971 | Lustig . |
| 3,576,095 | 4/1971 | Rivers . |
| 3,793,692 | 2/1974 | Tate et al. . |
| 3,871,840 | 3/1975 | Smith et al. . |
| 3,938,973 | 2/1976 | Kershaw . |
| 3,970,440 | 7/1976 | Copenhefer et al. . |
| 4,004,350 | 1/1977 | Squires . |
| 4,048,073 | 9/1977 | Rose . |
| 4,133,766 | 1/1979 | Adie . |
| 4,193,780 | 3/1980 | Cotton, Jr. et al. . |
| 4,211,851 | 7/1980 | Sasayama . |
| 4,216,003 | 8/1980 | Dischuk . |
| 4,322,230 | 3/1982 | Schoen et al. . |
| 4,333,752 | 6/1982 | Thies et al. . |
| 4,737,174 | 4/1988 | Pontius . |
| 4,917,862 | 4/1990 | Kraw et al. . |
| 5,002,596 | 3/1991 | Moskaitis et al. . |
| 5,062,272 | 11/1991 | Burns . |
| 5,087,276 | 2/1992 | Snyder . |

FOREIGN PATENT DOCUMENTS

| | | |
|---|---|---|
| 58-11024 | 1/1983 | Japan . |
| 963004 | 7/1964 | United Kingdom . |
| 1449119 | 9/1976 | United Kingdom . |
| 2029256 | 3/1980 | United Kingdom . |
| 2196270 | 4/1988 | United Kingdom . |
| 2198053 | 6/1988 | United Kingdom . |
| WO 89/10180 | 11/1989 | WIPO . |

OTHER PUBLICATIONS

Purafil, Inc., "Purafil Cell PC-12D", dated Sep. 21, 1977.

*Primary Examiner*—Jay H. Woo
*Assistant Examiner*—Robert Hopkins
*Attorney, Agent, or Firm*—Jones & Askew, LLP

[57] ABSTRACT

A disposable paperboard container for holding a bed of solid filtration media is disclosed. The container is strong enough to prevent excessive pillowing, has sufficient open area to minimize the pressure drop across the bed, avoids bypass gaps caused by settling of media, is made of environmentally safe disposable materials which do not react with the media or absorb excess moisture, and is inexpensive enough to be discarded rather than refilled. In accordance with other aspects of the invention, space within a media container created by settling is automatically occupied by expandable plugs to prevent bypass. Container units embodying the invention may be combined to form filtration modules which are strong, yet light enough to be handled easily.

6 Claims, 4 Drawing Sheets

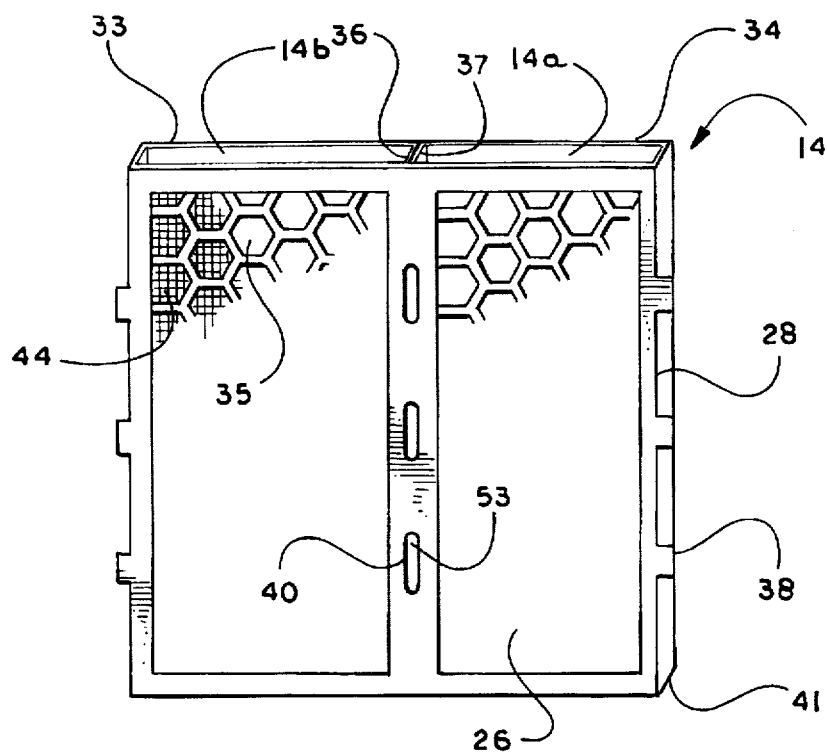
Fig_2
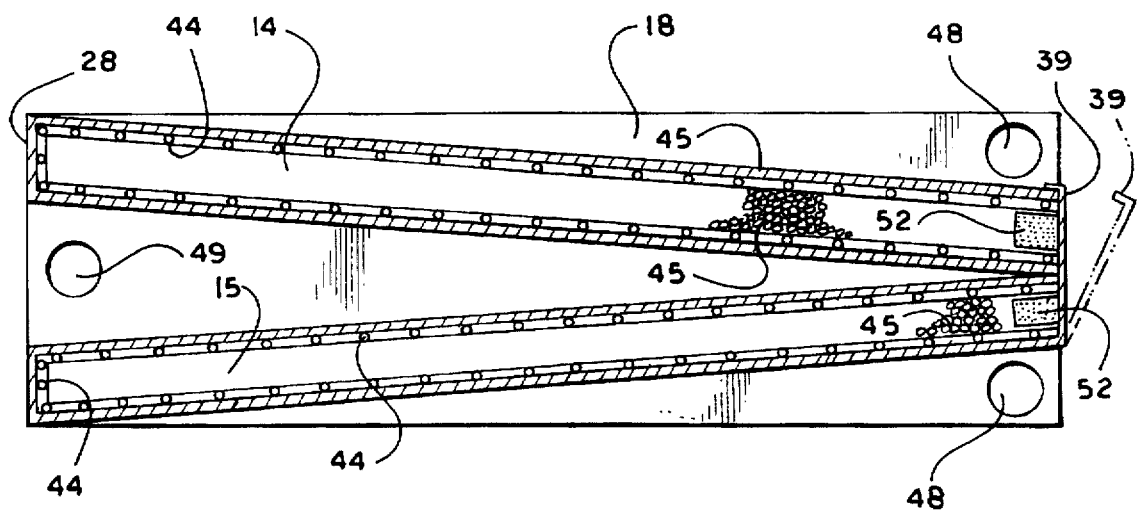
Fig_3

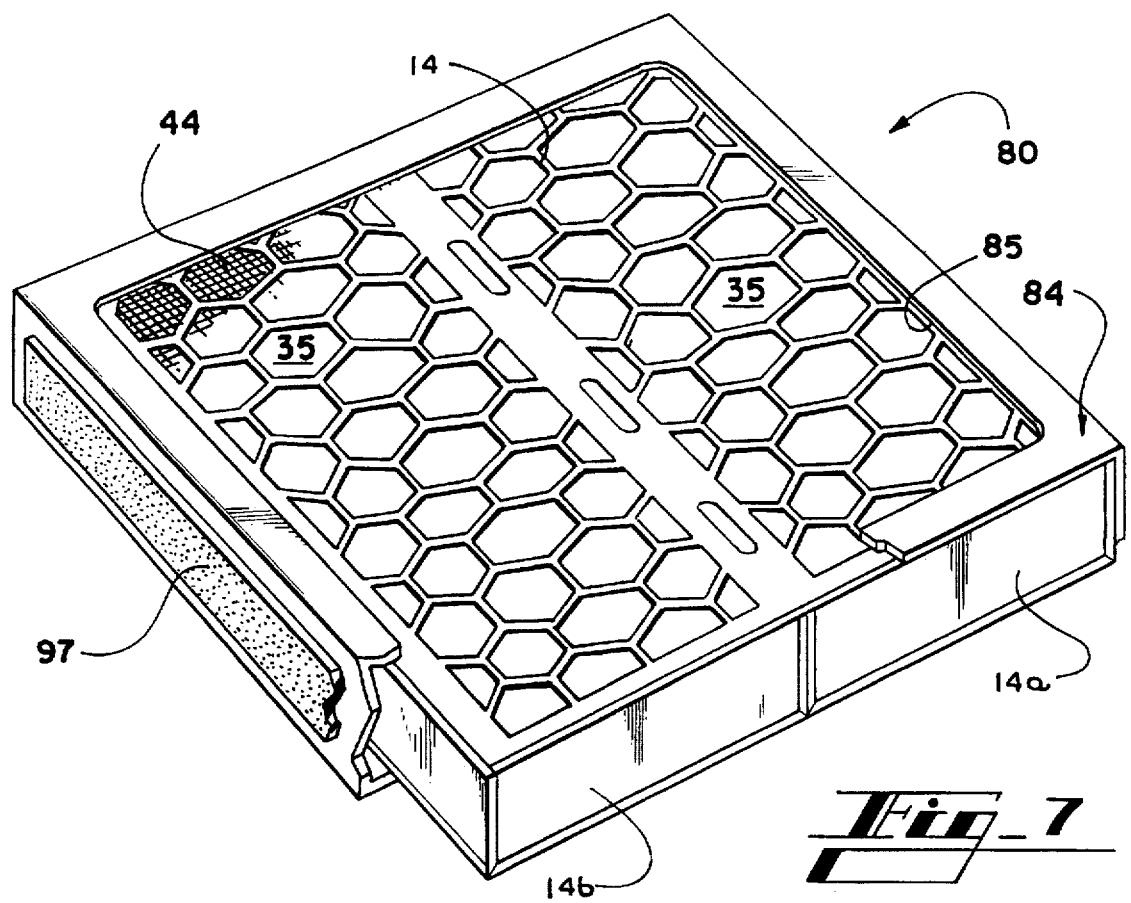
Fig_7
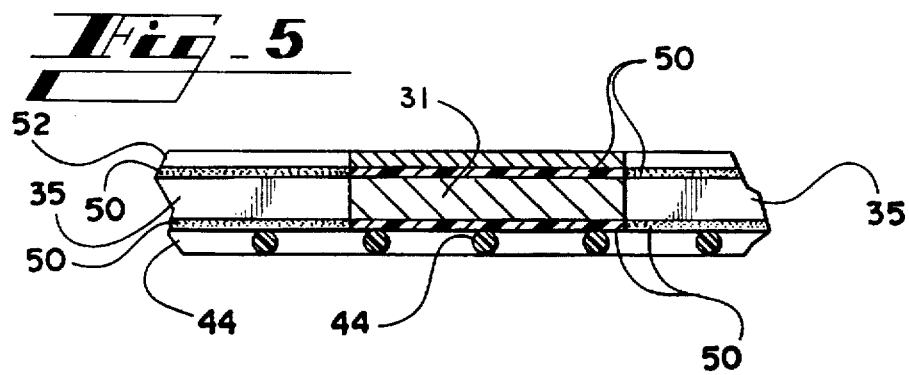
Fig_5
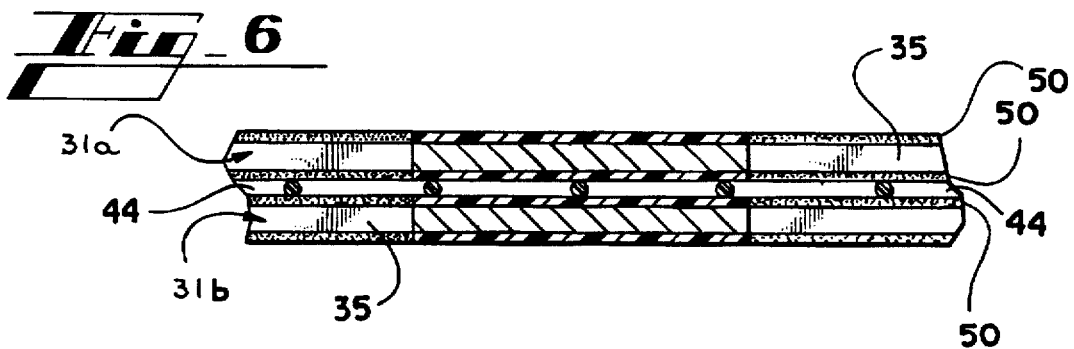
Fig_6

CONTAINER FOR SOLID FILTRATION MEDIA AND FILTRATION SYSTEM UTILIZING SAME

FIELD OF THE INVENTION

The present invention relates to air filtration devices which utilize beds of solid, dry-scrubbing filtration media, usually in pellet form. The media, such as impregnated alumina or activated carbon, adsorb and/or chemically react with contaminants in the gas stream. The invention more particularly relates to a disposable paperboard container for holding beds of such media, constructed to be positioned in a housing or duct through which the gas stream passes.

BACKGROUND OF THE INVENTION

Solid filtration media have long been used for air filtration. Since such media are typically in a particulate form such as pellets, they must be confined in a container to form a bed through which the contaminated air may flow. Such a container must have perforations or openings in opposing walls through which the gas enters and exits the bed. Standard containers or modules have been formed of metal or plastic with small perforations in the entry and exit walls to prevent spilling of the media through the perforations. In one instance, a plastic module has been lined with a screening material to help retain the media.

One form of known module is a flat box-like filter panel measuring, for example, two feet by two feet by one inch. Perforations are formed in the large planar walls which are spaced apart by short side walls. The media is poured into fill openings, and the module is slid into straight tracks positioned along the interior of a duct so that the module occupies the cross section of the duct.

Another form of known module provides a thin V-shaped chamber to be filled with media, supported between rectangular side plates. The assembled module may be slid into a duct. Fill doors have been provided in the side plates. In metal embodiments, the V-shaped chambers have been riveted or spot welded to the side plates, and in plastic embodiments the edges of the V-shaped chambers have been fitted into raised channels formed on the side plates, and the parts have then been welded or glued.

In the construction of modules which provide large, flat beds of solid filtration media, the materials from which the module is made must be strong enough and rigid enough to prevent excessive "pillowing" or bowing of the module walls. This phenomenon creates gaps between the module walls and the media, through which the gas flow can bypass the media and avoid filtration, drastically reducing the effectiveness of the filtration system. Bypass gaps can also be created by settling of media within the media chambers provided in a module. Another required characteristic is a relatively low pressure drop across the filtration system so that high pressures are not required to force the gas through the module. It may be specified, for example, that the filtration system accommodate a flow of up to 500 feet per minute (FPM). In each perforated module wall, prior art systems have provided about 40% open area by means of the perforations. Furthermore, the materials used must be able to withstand adverse environmental conditions as filtration systems are often located outdoors.

Users of such modules have generally reused the modules when the media is exhausted. The media may be poured out of the fill openings and new media poured into the modules, which may then be replaced in the ductwork. This process is time consuming and also tends to break down the media which may be mechanically fragile. Physical handling of alumina or carbon media, for example, tends to create dust which may pollute the atmosphere during the media replacement process or become entrained in the gas flow through the duct, clogging up particle filters in the system.

Therefore, there has been a need in the industry for a disposable module that may be filled at the factory, used by a customer, and discarded by the customer without removing the media. Such a disposable module, therefore, must be incinerable or biodegradable for acceptance by landfills, and must not give off any volatile solvents or other pollutants. The materials used must also be non-reactive with the media, and inexpensive enough to justify disposing of the module after one charge of media is exhausted.

In past attempts to provide a disposable plastic module, it was found that when the module was constructed of plastic strong enough to avoid pillowing and the formation of bypass gaps, the cost of the module led users to reuse the modules in the conventional manner rather than disposing of them. Attempts to use paper materials have also been unsuccessful. One such module uses the elongate flutes of corrugated material to hold the media, and directs the gas flow along the length of the flutes. In this system, the media settles within each flute, creating bypass gaps. Paperboard suitable for handling by conventional folding carton machinery is not known to have been used to make modules for solid filtration media, and generally would permit pillowing because of a lack of strength and rigidity.

Thus, there has been a need in the art for a disposable container for holding a bed of solid filtration media, that is strong enough to prevent excessive pillowing, provides sufficient open area to minimize pressure drop across the bed, avoids bypass gaps caused by settling of media, is made of environmentally safe disposable materials which do not react with the media or absorb excess moisture, and is inexpensive enough that the savings in the cost and inconvenience or refilling modules is not exceeded by the cost of the replacement module itself.

SUMMARY OF THE INVENTION

The present invention solves problems encountered in the art by providing a container for solid filtration media which meets the foregoing criteria. Container units embodying the invention may be combined to form filtration modules which are strong, yet light enough to be handled easily.

Generally described, the present invention provides a disposable container for solid filtration media, comprising a container formed from a unitary blank having two compartments. The container further includes a front wall defining a plurality of openings, the openings sized to allow flow through of gases, but not permitting the flow through of the solid filtration media. The container includes a back wall comprising a first panel and a second panel, each of the first and second panels defining a plurality of openings, the openings sized to allow flow through of gases, but not permitting the flow through of the solid filtration media. A first side wall is foldably attached to the front wall and to the first panel of the back wall, and second side wall is foldably attached to the front wall and to the second panel of the back wall, the second side wall being parallel to the first side wall. A bottom wall is provided comprising a flap foldably attached to the from wall, the flap being perpendicular to the first and second side walls. A pair of partition flaps are foldably attached to each of the first and second panels of the back wall, the partition flaps being parallel to the side walls, the partition flaps being on opposite sides of the panels from the side walls.

The blank is folded into the two-compartment container, and the front wall and the back wall are in spaced apart relation. The partition flaps foldably extend into the container midway between the first and second side walls to engage the front wall. The partition flaps define a longitudinal partition wall between the two compartments. The bottom wall flap is folded across the rectangular opening formed at the bottom of the container by the folding of the blank to form the bottom wall of the container.

Preferably, the container further comprises a solid portion of the unitary blank extending longitudinally across the front wall parallel to and midway between the first and second side walls. The solid portion defines a plurality of slots for receiving a plurality of tabs positioned along each of the partition flaps. The tabs secure the partition flaps to the front wall when the tabs are inserted into the slots.

According to another embodiment of the invention, a system for receiving solid filtration media is provided, comprising first and second containers. Each of the containers are formed from a unitary blank, the containers further including a front wall defining a plurality of openings, the openings sized to allow flow through of gases, the openings not permitting the flow through of the solid filtration media, and a back wall comprising a first panel and a second panel, each of the first and second panels defining a plurality of openings, the openings sized to allow flow through of gases, the openings not permitting the flow through of the solid filtration media.

A first side wall is foldably attached to the front wall and to the first panel of the back wall, and a second side wall is foldably attached to the front wall and to the second panel of the back wall, the second side wall being parallel to the first side wall. A bottom wall is provided comprising a flap foldably attached to the front wall, the flap being perpendicular to the first and second side walls. A pair of partition flaps are foldably attached to each of the first and second panels of the back wall, the partition flaps being parallel to the side walls, the partition flaps being on opposite sides of the panels from the side walls.

The blank is folded into the two-compartment container, the front wall and the back wall being in spaced apart relation, the partition flaps foldably extending into the container midway between the first and second side walls to engage the front wall, the partition flaps defining a longitudinal partition wall between the two compartments, and the bottom wall flap being folded across the rectangular opening formed at the bottom of the container by the folding of the blank to form the bottom wall of the container.

A pair of side plates is attached to the first and second containers along side walls of the containers so as to position the containers in a V-shaped configuration with the bottom walls of each of the containers spaced apart and the ends of the containers opposite the bottom walls positioned adjacent to one another. At least one closure flap is hingedly connected to at least one of the containers for enclosing the ends of both of the containers opposite the bottom walls, and an outer sleeve surrounds the containers and side plates and defines end openings of the sleeve at the ends of the containers.

Containers embodying the present invention are constructed of materials that can be incinerated without violating pollution control standards or are biodegradable in landfills.

Thus, it is an object of the present invention to provide an improved container for solid gas filtration media.

It is a further object of the present invention to provide a disposable container for solid gas filtration media.

It is a further object of the present invention to provide a disposable container formed from a unitary blank having a reinforcing internal partition.

It is a further object of the present invention to provide a disposable container for holding a bed of solid filtration media, that is strong enough to prevent excessive pillowing.

It is a further object of the present invention to provide a disposable container for holding a bed of solid filtration media that avoids bypass gaps caused by settling of media.

Other objects, features and advantages of the present invention will become apparent upon reviewing the following detailed description of preferred embodiments of the invention, in conjunction with the drawings and the appended claims.

BRIEF DESCRIPTION OF THE DRAWINGS

FIG. 2 is a perspective view of a media container for use in the media container unit shown in FIG. 1.

FIG. 3 is a side cross sectional view taken along line 5—5 of FIG. 1.

FIG. 5 is a fragmentary diagrammatic cross sectional view of the paperboard material used to form the media containers, laminated with protective coating and a barrier screen.

FIG. 6 is a fragmentary diagrammatic cross sectional view of another embodiment of the paperboard material used to form the media containers, laminated with protective coating and having a barrier screen between layers of paperboard material.

FIG. 7 is a front pictorial view of a second embodiment of a filtration module according to the present invention, with portions of the outer shell broken away to show interior detail.

DETAILED DESCRIPTION

Figure 1:
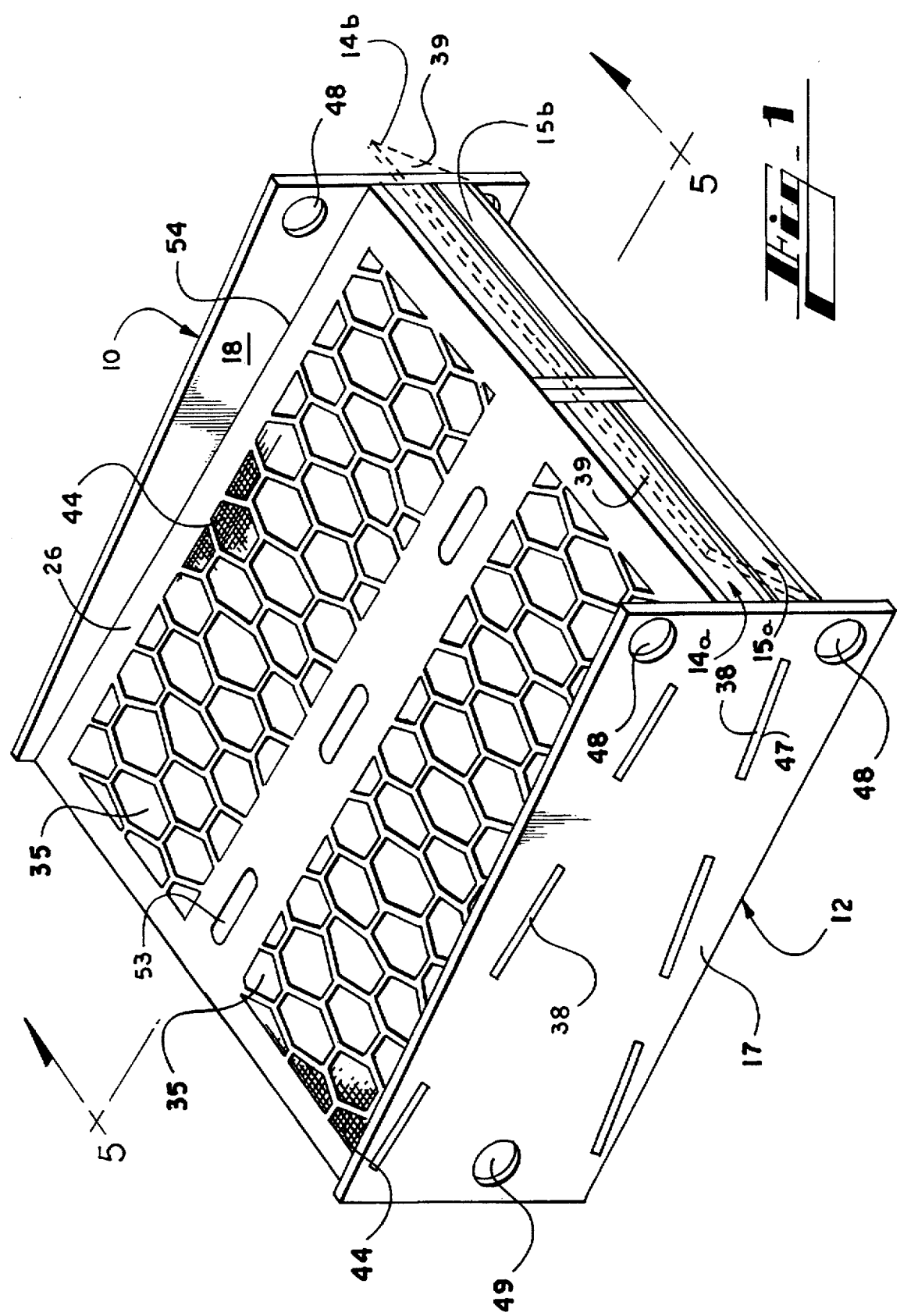
FIG. 1 is a front pictorial view of a media container unit embodying the invention.

Referring now in more detail to the drawings, in which like numerals represent like parts throughout the several views, FIG. 1 shows a filtration container unit 10 embodying the present invention. It should be understood that, if desired, multiple units 10 may be used side-by-side to fill a larger duct cross section. As shown in FIG. 1, a unit 10 defines two thin flat media containers, an upper media container 14 and a lower media container 15, arranged in the shape of a "V" lying on its side with the point of the "V" directed toward the front of the unit. The media containers 14 and 15 extend between a left side plate 17 and a right side plate 18. For purposes of this description, it should be understood that media containers 14 and 15 are identical. The unit 10 is typically slid into ductwork along the axis marked 5—5.

It should be understood that directional language used in this application is solely for defining a frame of reference for use in describing the relative relationships of the elements shown, and not to indicate that any particular orientation of the modules or containers is required during use. In fact, the units may be used in any orientation. They may be positioned in a gas flow generally along the axis marked B such that the gas either enters or exits from the mouth of the "V" configuration formed by the media containers 14 and 15.

Figure 4:
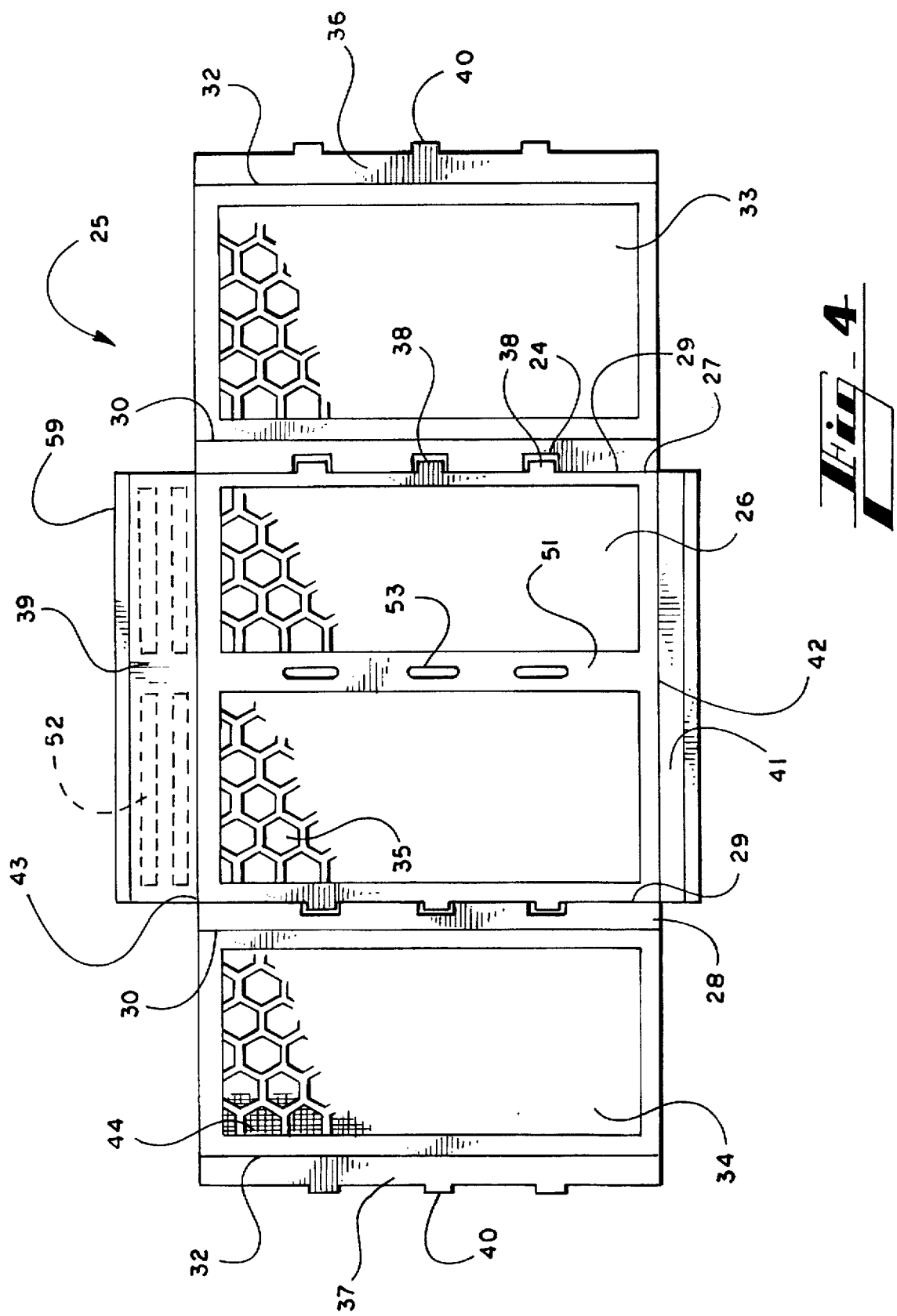
FIG. 4 is a plan view of the inner side of a blank of paperboard material used to form a media container as shown in FIG. 2.

Referring now to FIGS. 1, 2, and 4 and turning to the structure of the media container unit 10, each media container 14 and 15 is a container having two internal compartments 14a, 14b and 15a and 15b, respectively. As shown in FIG. 4, the media containers 14 and 15 are formed from a unitary blank 25 of elongate paperboard. It is understood that the containers 14 and 15 may be made from other foldable materials such as aluminum or plastic. The elongate blank 25 is divided by score lines into panels. A broad front wall panel 26 is foldably attached to adjacent narrow side wall panels 27 and 28 by score lines 29.

As shown in FIG. 4, the front wall panel 26 includes a solid support portion 51 running longitudinally down the center of the front wall panel 26 and midway between the score lines 29. The support portion 51 includes a plurality of slots 53 to which the partition flaps 36 and 37 (discussed below) are secured. A plurality of elongate tabs 38 are formed by cuts 24 along the score lines 29. The tabs 38 project outwardly at intervals from the edges of the front wall panel 26 to assist in attaching the containers to the side plates 17 and 18, as shown in FIGS. 1 and 2.

The side wall panels 27 and 28 are foldably attached to the opposing back wall panels 33 and 34, respectively, by the score lines 30. The back wall panels 33 and 34 are each one-half the width of the front wall panel 26. Narrow partition flaps 36 and 37 having the same width as the side wall panels are foldably attached to the back wall panels 33 and 34, respectively, by the score lines 32. A plurality of tabs 40 are formed along the exposed edges of the partition flaps 36 and 37. The bottom flap 41 is foldably attached to one edge of the front wall panel 26 by a score line 42. In the case of one of the containers 14 or 15, an end cover 39 is foldably attached to another edge of the front wall panel 26 opposite the bottom flap 41 along a score line 43. The end cover 39 is used to enclose the open ends of both containers 14 and 15, as will be described below.

Referring now to FIGS. 2 and 4, the blank 25 is folded along the above-described score lines, to form a media container 14. When the blank 25 is folded along the above-described score lines the back wall panels 33 and 34 are in parallel, spaced apart relation to the front wall panel 26. The partition flaps 36 and 37 are folded at the center of the container where the back wall panels 33 and 34 meet, and the tabs 40 are inserted into the slots 53.

The partition formed by the partition flaps 36 and 37 divides the container 14 into two compartments 14a and 14b. The partition provides reinforcing structural support to the container 14, and thus, provides for a wider span from the first side wall 27 to the second side wall 28. Additionally, the partition enhances the container's load bearing capability caused by flow through of gases and the weight of filtration media. The bottom flap 41 is folded across the opening formed at the bottom of the container to form a bottom wall of the container 14.

After the blank 25 is folded to form the container 14, a bead of glue is run underneath the bottom wall flap 41 such that the bottom flap 41 will be secured to the bottom outside edge of the back wall panels 33 and 34 to permanently secure and seal the bottom flap 41 as shown in FIGS. 2 and 4. Likewise, a bead of glue is run between the partition flaps 36 and 37 to secure the flaps together and to provide a seal against flow through of gases when the container is in operation. After the tabs 40 are inserted into the slots 53, the slots 53 are filled with a quantity of glue sufficient to secure the partition flaps 36 and 37 to the inside of the front wall 26. The glue added to the slots 53 also provides a flush surface area along the support portion 51 of the front wall 26 and prevents undesirable leakage of gases through the slots 53.

When the space between the front wall panel 26 and the back wall panels 33 and 34 is filled with media, the media forms a thin, flat bed. The height of the side wall panels and the partition flaps can be varied to provide a bed depth of from ¼ inch to 3 inches.

A plurality of openings 35 are formed in the front and back walls of the container formed by the panels 26, 33 and 34 so that gas can flow in through one wall, through the bed of media, and out through the other wall. In the embodiment shown, the openings 35 are hexagonal, each hexagon having a maximum diameter of 1 and ½ inches, and side length of ¾ inch.

The openings 35 may be die cut in the paperboard, and sufficient material is provided between the hexagons to preserve the rigidity of the paperboard and thereby prevent pillowing. Shapes other than hexagons may be used, but die cutting is facilitated when the sides of the openings are straight lines. In the preferred embodiment, the minimum distance between the openings 35 is ¼ inch. The openings extended over the entire area of the support panels except a border strip 36, which is preferably ⅛ to 1 inch wide. The orientation and size of the openings is such that 60–70% of the support panel is open area, in contrast to the usual 40% achieved in perforated metal or plastic module panels.

In a preferred embodiment, a pair of foam pads 52 are attached to the inner surface of the end cover panel 39 as shown in FIGS. 3 and 4. The foam pads 52 extend into the containers 14 and 15 and are compressed against the media 45, as shown in FIG. 3. Upon any settling of the media, the foam expands to pack the media into the container and to fill any gaps that could allow the gas flow to bypass the media. The foam can be any conventional foam that has a good memory after being compressed for a period of time, that generates enough compression force for the purpose, and that does not react with the media or the contaminants in the gas stream, or break down under normal filtration system operating conditions. The use of the pads 52 assists in maintaining a contact efficiency of gas molecules contacting the media at near 100% during a single pass through the filtration module.

As the openings 35 can be larger than typical pellets of adsorptive media used in solid filtration beds, a gas permeable barrier such as a screen 44 is attached as a liner to the interior surfaces of the media containers 14 and 15, as shown in FIGS. 2, 3 and 4. The screen 44 may be attached to either the interior or the exterior surface of the support panels, and preferably is adhered to the paperboard surface at all points between and around the openings 35. The screen material is preferably formed of thin strands of plastic-covered fiberglass or polyethylene that are woven or welded to form a mesh. The mesh openings may be, for example, 1/16 inch, and may vary depending on the size of the media. Alternately, a particle filter pad such as that used in home furnace filters can be used to provide the gas permeable barrier associated with the support panels. The barrier must be strong enough to retain the weight of the media while being open enough to create an acceptably small pressure drop across the filtration system.

In assembly of the media containers 14 and 15, the screen 44 is applied to the blank 25. Then, the blank 25 is folded as described above. As shown in FIG. 1, the side plates 17 and 18 are provided with slots 47 which receive the tabs 38 of the end walls 27 and 28, as shown in FIG. 1. The tabs and slots position the two containers in a "V" configuration with the bottom walls 41 spaced apart at the rear end of the unit 10, and the open ends of the two containers 14 and 15 touching at the front end of the unit. Preferably, the adjacent inner side walls of the containers are glued together at the front end of the unit.

The containers are filled through their front open ends with the unit standing on its rear end. After the containers are filled completely, the end cover panel 39 is pivoted about the score 43 to a position as shown in FIG. 3, with the foam pads or plugs 52 extending into the containers and compressing against the media 45. The end cover panel 39 is sized to cover the open ends of both containers, and may be glued in place to seal such open ends. If desired, the blank 25 may be provided with an additional glue panel 59, shown in FIG. 4, extending from the panel 39, to be folded and glued onto the exterior surface of the side wall panel opposite to side wall 26 of the upper container 14, as shown in FIG. 3.

Manipulation of the units is facilitated by providing front finger openings 48 in the front top and bottom corners of the side plates 17 and 18 as best shown in FIG. 1. Additionally, a rear finger opening 49 may be provided in each side plate adjacent to its rear edge between the containers 14 and 15.

The nature of the paperboard material used for the blanks 25 and the side walls 17 and 18 directly affects the service life and performance of the units 10. It has been found that a particularly good material is a sized, multi-ply paperboard 31 that is coated with a water-resistant material 50, as shown in FIG. 5. The preferred material has 5 plies laminated with polyvinyl alcohol. Each ply is 100% sized during manufacture with a conventional natural or synthetic resin to inhibit water absorption. For rigidity sufficient to minimize pillowing, the multi-ply board should be at least 0.090 inch in thickness, preferably 0.120 to 0.130 inch.

The exterior coating 50 is preferably a layer of low density polyethylene, although other plastics may be used. A suitable commercially available water-resistant board is sold by Rock-Tenn Company under the mark CLIM-A-TEX. Such a product off-gases no solvents and lasts for over a year in outdoor systems without serious delamination or other degradation. It also prevents the paperboard from reacting with chemicals in the media. After die-cutting of the openings 35, the bare cut edges may be coated with a similar plastic by a spraying or dipping process.

As shown in FIG. 5, the screen 44 may be attached to the board material 31 by using the water-resistant coating 50 as an adhesive. For example, if the coating 50 is a thermoplastic material, it may be heated and the screen pressed into it prior to cooling. Or, the screen may be embedded in a hot melt coating during initial coating of the board. Alternatively, a pressure-sensitive adhesive could be applied to the board to receive the screen under pressure. FIG. 6 shows an alternate embodiment in which the screen 44 is sandwiched between two layers 31a and 31b of adhesive-coated board. The layers could be separate sheets or one sheet folded over onto itself.

To further protect the structure from water absorption through paperboard edges, beads of plastic sealant, such as polyethylene adhesive, are placed along joints at 54 between the end walls 27 and 28 and the side plates 17 and 18, as shown in FIG. 1.

Another embodiment of the present invention is shown in FIG. 7. In FIG. 7, the solid filtration module 80 is of the flat panel variety, intended for insertion into tracks in ductwork such that the module lies across the direction of the gas flow. The module 80 includes a media container 14 enclosed in an outer shell 84. It is understood that a plurality of media containers 14 may be placed side-by-side and enclosed in an outer shell 84 to form a larger rectangular bed. It is also readily understood that container 14 may be used as a filtration module according to this embodiment without the use of outer shell 84. If container 14 is used without outer shell 84, tabs 38, shown in FIGS. 2 and 4, will not be cut into side walls 27 and 28. The shell 84 defines one or more large openings 85 in its two large planar panels, to expose the units 82 to gas flow. The shell 84 may be a sleeve open at one or both ends, or a conventionally formed paperboard box with end closures (not shown).

The container 14 is formed with spaced apart walls as described above in connection with the embodiment shown in FIG. 1, and defines openings 35 and support a barrier screen 44. While only the upper wall 26 is visible in FIG. 7, it should be understood that the lower wall panel is of identical construction. A top end closure panel 39 of container 14, as shown in FIG. 4 (not shown in FIG. 7), preferably is foldably connected to one of the wall panels and glued after media loading to the opposite wall panel.

In the event that two or more modules 80 are needed to span a duct, a resilient sealing strip 97 of foam or the like is attached along a side panel of the outer shell 84 to abut an adjacent module so as to prevent bypass of gas flow. Alternately, adjacent modules 80 may be joined by pressure-sensitive adhesive.

While this invention has been described with particular reference to preferred embodiments thereof, it should be understood that variations and modifications can be made without departing from the spirit and scope of the invention as defined in the appended claims.

What is claimed is:

1. A disposable container for solid filtration media formed from a unitary blank including two compartments, and further comprising:

a front wall defining a plurality of openings, said openings sized to allow flow through of gases, said openings not permitting the flow through of said solid filtration media;

a back wall comprising a first panel and a second panel, each of said first and second panels defining a plurality of openings, said openings sized to allow flow through of gases, said openings not permitting the flow through of said solid filtration media;

a first side wall foldably attached to said front wall and to said first panel of said back wall;

a second side wall foldably attached to said front wall and to said second panel of said back wall, said second side wall being parallel to said first side wall;

a bottom flap foldably attached to said front wall, said flap being perpendicular to said first and second side walls;

a pair of partition flaps, one foldably attached to each of said first and second panels of said back wall on opposite sides of said first and second panels from said first and second side walls, said partition flaps being parallel to said first and second side walls;

said blank being folded into said container, with said front wall and said back wall being in spaced apart relation, said partition flaps foldably extending into said container intermediate said first and second side walls to engage said front wall and define a longitudinal partition wall between said two compartments, said bottom flap being folded across a rectangular opening formed at the bottom of said container by said front, back and side wall panels.

2. The container of claim 1 further comprising a solid portion of said unitary blank extending longitudinally across said front wall parallel to and midway between said first and second side walls, said solid portion defining a plurality of slots for receiving a plurality of tabs positioned along each of said partition flaps, said tabs securing said partition flaps to said front wall when said tabs are inserted into said slots.

3. A disposable container for solid filtration media having two compartments and a wall structure formed from a unitary blank, said wall structure including integral bottom, side and front and back walls, said bottom wall being formed by a bottom flap foldably attached to said front wall, said front wall to which said flap is foldably attached being equal in width to the width of said container, said back wall being formed from a first panel and a second panel of said unitary blank, wherein the combined width of said first and second panels is equal to said width of said container, said first and second panels each further comprising a partition flap foldably attached to each of said first and second panels, said partition flaps being equal in width to the width of said side walls of said container, said blank being folded into said two-compartment container with said partition flaps foldably extending inwardly into said container parallel to said side walls and midway between said side walls to define a longitudinal partition, said bottom flap being folded across the rectangular opening formed by said folding of said blank to form said bottom wall of said container;

said front and back walls of said container being in spaced apart relation and further defining a plurality of openings sized to allow flow through of gases, said openings not permitting the flow through of said solid filtration media.

4. The container of claim 3 further comprising a solid portion of said unitary blank extending longitudinally across said front wall parallel to and midway between said side walls, said solid portion defining a plurality of slots for receiving a plurality of tabs positioned along each of said partition flaps, said tabs securing said partition flaps to said front wall when said tabs are inserted into said slots.

5. A system for receiving solid filtration media, comprising:

first and second containers, each of said containers formed from a unitary blank, said containers further including:

a front wall defining a plurality of openings, said openings sized to allow flow through of gases, said openings not permitting the flow through of said solid filtration media;

a back wall comprising a first panel and a second panel, each of said first and second panels defining a plurality of openings, said openings sized to allow flow through of gases, said openings not permitting the flow through of said solid filtration media;

a first side wall foldably attached to said front wall and to said first panel of said back wall;

a second side wall foldably attached to said front wall and to said second panel of said back wall, said second side wall being parallel to said first side wall;

a bottom wall comprising a flap foldably attached to said front wall, said flap being perpendicular to said first and second side walls;

a pair of partition flaps foldably attached to each of said first and second panels of said back wall, said partition flaps being parallel to said first and second side walls, said partition flaps being on opposite sides of said first and second panels from said first and second side walls; and said blank being folded into a two-compartment container, said front wall and said back wall being in spaced apart relation, said partition flaps foldably extending into said container midway between said first and second side walls to engage said front wall, said partition flaps defining a longitudinal partition wall between said two compartments, said bottom wall flap being folded across a rectangular opening formed at the bottom of said container by said folding of said blank to form said bottom wall of said container;

a pair of side plates attached to said first and second containers along said first and second side walls of said containers so as to position said containers in a V-shaped configuration with said bottom walls of each of said containers spaced apart and the ends of said containers opposite said bottom walls positioned adjacent to one another; and at least one closure flap hingedly connected to at least one of said containers for enclosing the ends of both of said containers opposite said bottom walls.

6. The container of claim 5 further comprising a solid portion of said unitary blank extending longitudinally across said front wall parallel to and midway between said first and second side walls, said solid portion defining a plurality of slots for receiving a plurality of tabs positioned along each of said partition flaps, said tabs securing said partition flaps to said front wall when said tabs are inserted into said slots.

* * * * *